(12) United States Patent
Ohara

(10) Patent No.: US 8,132,604 B2
(45) Date of Patent: Mar. 13, 2012

(54) PNEUMATIC TIRE

(75) Inventor: Masaaki Ohara, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 1006 days.

(21) Appl. No.: 12/101,239

(22) Filed: Apr. 11, 2008

(65) Prior Publication Data

US 2008/0257469 A1  Oct. 23, 2008

(30) Foreign Application Priority Data

Apr. 18, 2007 (JP) ................. 2007-109096

(51) Int. Cl.
*B60C 11/01* (2006.01)
*B60C 11/13* (2006.01)
(52) U.S. Cl. ......... 152/209.16; 152/209.21; 152/209.27; 152/DIG. 3
(58) Field of Classification Search ............. 152/209.16, 152/209.21, 209.27, DIG. 3
See application file for complete search history.

(56) References Cited

U.S. PATENT DOCUMENTS

| | | | | |
|---|---|---|---|---|
| 2,322,505 | A * | 6/1943 | Bull | 152/209.21 |
| 3,024,825 | A | 3/1962 | Kutsmichel | |
| 4,214,618 | A * | 7/1980 | Takigawa et al. | 152/209.16 |
| 4,230,512 | A * | 10/1980 | Makino et al. | 152/209.21 |
| 4,462,446 | A * | 7/1984 | Goergen et al. | 152/209.18 |
| 2003/0005992 | A1 | 1/2003 | Radulescu | |

FOREIGN PATENT DOCUMENTS

| | | | |
|---|---|---|---|
| JP | 49-24081 | | 3/1974 |
| JP | 03-007604 | * | 1/1991 |
| JP | 2002-512575 | | 4/2002 |
| JP | 2003-048408 | | 2/2003 |
| JP | 2004-268783 | | 9/2004 |

OTHER PUBLICATIONS

Office Action for Japanese Application No. 2007-109096 dated Oct. 21, 2011 with English translation.

* cited by examiner

*Primary Examiner* — Steven D Maki
*Assistant Examiner* — Robert Dye
(74) *Attorney, Agent, or Firm* — Fish & Richardson P.C.

(57) ABSTRACT

A pneumatic tire comprising a shoulder rib segmented into a main rib located at the inner side thereof in a width direction of the tire and a thin rib located at the outer side thereof in the width direction of the tire by a thin groove extending along a circumferential direction of the tire, wherein the thin groove includes a large-width portion having a relatively larger groove width and a small-width portion having a relatively smaller groove width continuously formed one after the other along the circumferential direction of the tire, and an inner wall of the large-width portion located at the thin rib side is disposed at a further outer side with respect to an inner wall of the small-width portion located at the thin rib side as viewed in the width direction of the tire, a protruding portion protruding outwardly in the width direction of the tire from an edge line of the thin rib located at the outer side in the width direction of the tire is formed at a position where the large-width portion is disposed in the circumferential direction of the tire.

3 Claims, 4 Drawing Sheets

PNEUMATIC TIRE

BACKGROUND OF THE INVENTION

1. Field of the Invention

The present invention relates to a pneumatic tire comprising a shoulder rib segmented into a main rib located at the inner side thereof in a width direction of the tire and a thin rib locate at the outer side thereof in the width direction of the tire by a thin groove extending along a circumferential direction of the tire.

2. Description of the Related Art

Pneumatic tires with a rib-based tread pattern for long-distance trucks or buses have the following problem. That is, the tires tend to suffer irregular wear in which shoulder rib thereof wears away earlier than a central area of the tread. Therefore, even when the tire has not been worn so heavily yet as a whole, the tire needs to be replaced with a new one due to the irregular wear.

As preventive measures against the above problem, for example, Japanese Unexamined Patent Publication No. 2004-268783 and Japanese Published Patent Publication No. 2002-512575 disclose tires such that a low rigidity thin rib is formed on a shoulder rib, which is segmented by a thin groove extending in a circumferential direction of the tire, to thereby prevent the irregular wear.

In the above-mentioned tires, when the tire is deformed, the thin rib is tilted inwardly in a width direction of the tire and received by a main rib. When the thin groove is arranged to have a large width, the thin rib deflects a large amount, and an edge portion of the thin rib comes into contact with an inner wall surface of the main rib and the inner wall surface thereof is closer to the bottom of the groove and lower than an edge portion of the main rib. As a result, when the tire is deformed, since the edge portion of the main rib is exposed, the protective performance for the edge portion of the main rib is reduced, and the edge portion of the main rib suffers damage. Such damage on the edge portion of the main rib functions as an inception and may develop, to an irregular wear on the entire shoulder rib around the damage as a core. Therefore, when the width of the thin groove is too large, preventive effect against the irregular wear may be reduced.

On the other hand, when the thin groove is formed in a small width and when the tire is deformed, only a small deflection is generated on the thin rib. As a result, when the thin rib is tilted inwardly in a width direction of the tire, an edge portion of the thin rib comes close to the edge portion of the main rib. As result, the protective performance on the edge portion of the main rib is increased. Since the edge portion of the main rib is prevented from being damaged, the preventive effect against the irregular wear of the shoulder rib is increased. However, when the width of the thin groove is reduced, a thin groove forming blade on a tire-producing die also needs to be thin enough. As a result, the durability of the blade is reduced, and the blade may be bent or broken while removing the tire from the die. Thus, the prevention of the irregular wear of the shoulder rib and the durability of the thin groove forming blade are in an antinomic relationship.

SUMMARY OF THE INVENTION

The present invention has been made in view of the above-described circumstances. An object of the present invention is to provide a pneumatic tire capable of adequately preventing irregular wear of a shoulder rib while satisfactorily ensuring durability of a thin groove forming blade.

The above described object can be achieved by the present invention as follows. That is, the present invention provides a pneumatic tire comprising a shoulder rib segmented into a main rib located at the inner side thereof in a width direction of the tire and a thin rib located at the outer side thereof in the width direction of the tire by a thin groove extending along a circumferential direction of the tire, wherein the thin groove includes a large-width portion having a relatively larger groove width and a small-width portion having a relatively smaller groove width continuously formed one after the other along the circumferential direction of the tire, and an inner wall of the large-width portion located at the thin rib side is disposed at a further outer side with respect to an inner wall of the small-width portion located at the thin rib side as viewed in the width direction of the tire, a protruding portion protruding outwardly in the width direction of the tire from an edge line of the thin rib located at the outer side in the width direction of the tire is formed at a position where the large-width portion is disposed in the circumferential direction of the tire.

According to the above-described arrangement, the thin groove includes a large-width portion and a small-width portion formed continuously one after the other along the circumferential direction of the tire. The inner wall of the large-width portion located at the thin rib side is disposed at the further outer side with respect to the inner wall of the small-width portion located at the thin rib side as viewed in the width direction of the tire. Therefore, a thick portion corresponding to the large-width portion is periodically formed on the thin groove forming blade. With this arrangement, the durability of the thin groove forming blade can be satisfactorily ensured. Further, since the thin groove has the small-width portion of a small groove width, when the tire is deformed, the deflection amount of the thin rib is reduced. Therefore, exposed edge portion of the main rib can be reduced. Accordingly, the edge portion of the main rib is prevented from getting damaged; and thus, the preventive effect against the irregular wear of the shoulder rib is increased.

In the case where the inner wall of the large-width portion located at the thin rib side is disposed at the further outer side with respect to the inner wall of the small-width portion located at the thin rib side as viewed in the width direction of the tire, when the edge line located at the outer side of the thin rib as viewed in the width direction of the tire is formed in a straight-line configuration, the rigidity of the thin rib changes in the circumferential direction of the tire. As a result, it is concerned that the thin rib fails to be deformed uniformly on the circumference thereof resulting in a local wear such as a wear out of the edge on the main rib. Therefore, in the pneumatic tire according to the present invention, a protruding portion that protrudes outwardly in the width direction of the tire from the edge line of the thin rib located at the outer side in the width direction of the tire is formed at a position where the large-width portion is disposed in the circumferential direction of the tire. Thereby, when the thin rib comes into contact with the ground, the deformation of the thin rib due to the compression load is transferred uniformly on the circumference, and thus local wear of the shoulder rib is prevented.

In the pneumatic tire mentioned hereinbefore, it is preferable that the small-width portion has a groove width at the groove bottom enlarged toward the thin rib side and a groove width of the thin groove at the groove bottom is constant in the circumferential direction of the tire. According to the arrangement as described above, the groove width of the small-width portion at the groove bottom is expanded toward the thin rib side, and the groove width of the thin groove at the groove bottom is constant in the circumferential direction of the tire. With this arrangement, not only in the large-width portion but also in the small-width portion, a large curvature of the groove bottom can be ensured. Accordingly, even when the thin rib is largely deformed, the convergence of the stress at the groove bottom is prevented; and thus, the crack-proof performance at the groove bottom can be increased.

In the pneumatic tire mentioned hereinbefore, it is preferable that the ratio of a total length of the large-width portion in the circumferential direction of the tire with respect to a total length of the thin groove in the circumferential direction of the tire is 0.2 or more. Since the ratio of the total length of the large-width portion in the circumferential direction of the tire with respect to the length of the thin groove in the circumferential direction of the tire is 0.2 or more, the thick portion of the thin groove forming blade can be ensured at a ratio of 0.2 or more, thereby the durability of the thin groove forming blade can be ensured further satisfactorily.

DETAILED DESCRIPTION OF THE PREFERRED EMBODIMENTS

Figure 1:
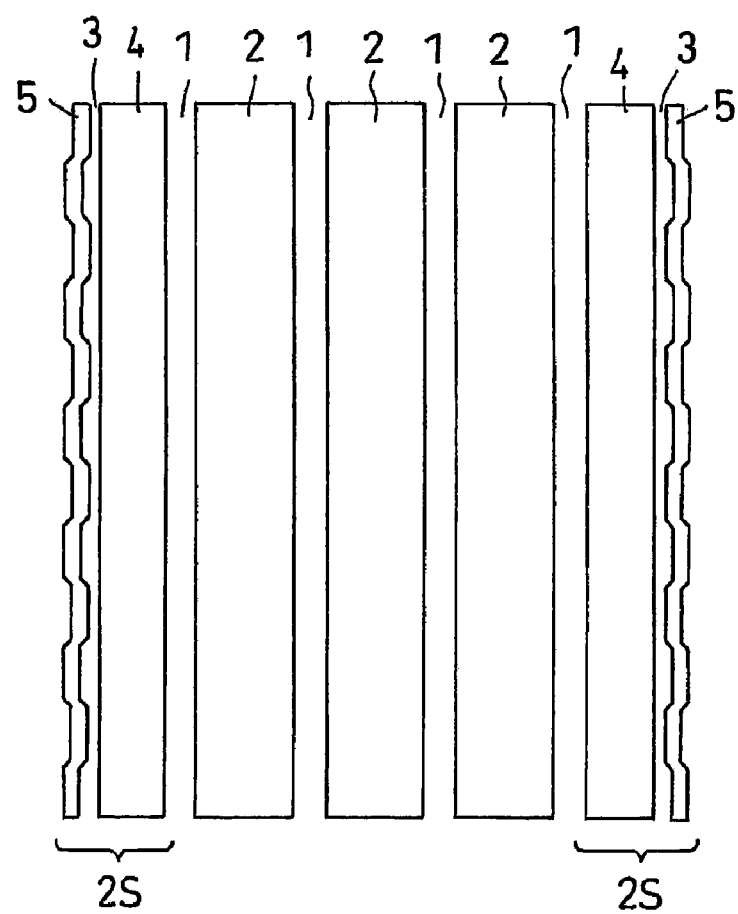
FIG. 1 is a development view of an example of a tread face of a pneumatic tire according to the present invention.
Figure 2:
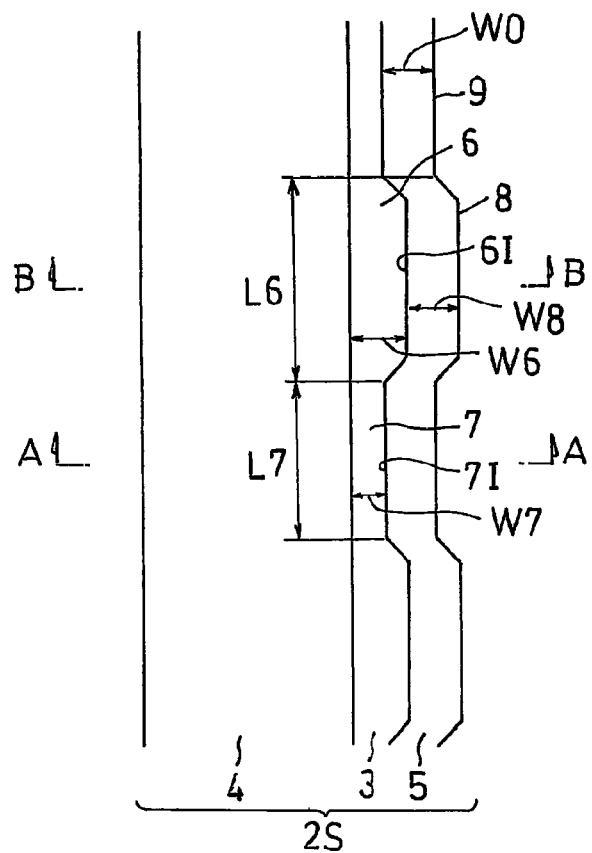
FIG. 2 is an enlarged view of a shoulder rib of a pneumatic tire according to the present invention.
Figure 3:
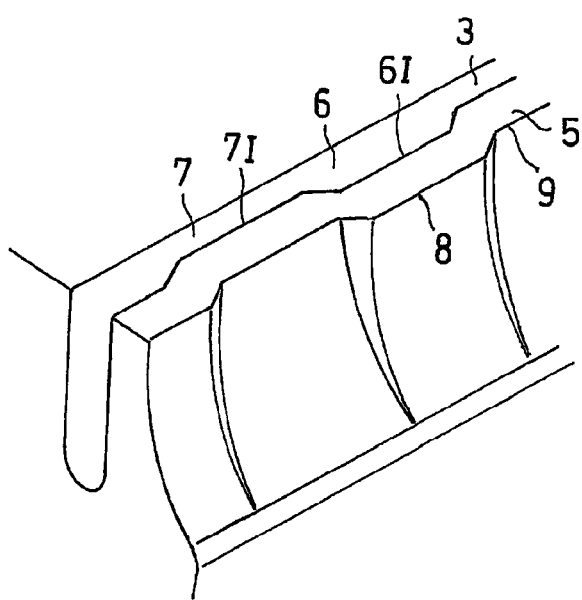
FIG. 3 is a cross-sectional perspective view of the shoulder rib taken along a meridian of a pneumatic tire according to the present invention.

Hereinafter, an embodiment of the present invention will be described with referring to the accompanying drawings. FIG. 1 is a development view of an example of a tread face of a pneumatic tire according to the present invention. FIG. 2 is an enlarged view of a shoulder rib of the tire. FIG. 3 is a cross-sectional perspective view of the shoulder rib taken along a meridian of the tire.

The pneumatic tire has a rib-based tread pattern that includes a plurality of ribs 2 segmented by a plurality of main grooves 1 extending in a circumferential direction of the tire as shown in FIG. 1. A shoulder rib 2S includes a main rib 4 and a thin groove 3. The shoulder rib 2S is disposed outside a main groove 1 disposed, in the plurality of main grooves 1, at the outermost side as viewed in the width direction of the tire. The shoulder rib 2S is segmented, by the thin groove 3 extending along the circumferential direction of the tire, into a main rib 4 located at the inner side of the shoulder rib 2S as viewed in the width direction of the tire and a thin rib 5 located at the outer side thereof as viewed in the width direction of the tire. Here, the thin groove 3 is preferably formed in an area within 5% of a tread width, from the contact end of tread face of the tire, that comes into contact with the ground since the irregular wear is effectively prevented.

As shown in FIG. 2 and FIG. 3, the thin groove 3 includes a large-width portion 6 that has a relatively larger groove width and a small-width portion 7 that has a relatively smaller groove width. The large-width portion 6 and the small-width portion 7 are formed continuously one after the other along the circumferential direction of the tire. With respect to the inner wall 7I, located at the thin rib 5 side of the small-width portion 7, an inner wall 6I, located at the thin rib 5 side of the large-width portion 6, is disposed at the further outer side as viewed in the width direction of the tire. Therefore, thick portions corresponding to the large-width portions 6 are formed periodically on a forming blade for the thin groove 3. Furthermore, the thin groove 3 includes a small-width portion 7 that has a smaller groove width. When the tire is deformed, the small-width portion 7 reduces the deflection amount of the thin rib 5 and prevents the edge portion of the main rib 4 from being exposed to the outside. With this arrangement, the damage on the edge portion of the main rib 4 is prevented, and the preventive effect against the irregular wear of the shoulder rib 2S is accordingly increased.

In order to optimally arrange the width of the thick portion of the thin groove forming blade corresponding to the large-width portion 6 to satisfactorily ensure the durability of the thin groove forming blade, the groove width W6 of the large-width portion 6 is preferably arranged to be 2.0 mm or more, more preferably 3.0 mm or more. On the other hand, to optimally prevent the irregular wear of the shoulder rib 2S, the groove width W7 of the small-width portion 7 is preferably arranged to be 1.5 mm or less, more preferably 1.0 mm or less. By setting the ratio W6/W7 between the groove width W6 of the large-width portion 6 and the groove width W7 of the small-width portion 7 to be 2.0 to 4.0, the above-described operational advantage is optimally obtained in a well-balanced manner.

Although the shape of the large-width portion 6 in the tread face is not particularly limited, for example, a trapezoidal shape formed by the inner wall 6I located at the thin rib 5 side of the large-width portion 6 and lines connecting to the side ends of the large-width portion 6 may be exemplified as shown in FIG. 2.

In the present invention, the inner wall of the thin groove 3 located at the main rib 4 side is preferably formed in a plan surface. With this arrangement, the rigidity of the main rib 4 at the thin groove 3 side becomes even on the circumference thereof. Further, the thin rib 5 is easily brought into contact with the main rib 4 therealong, and thus the irregular wear of the shoulder rib 2S can be optimally prevented.

In a position where the large-width portion 6 is disposed in the circumferential direction of the tire, a protruding portion 8 protruding outwardly in the width direction of the tire from an edge line 9 of the thin rib 5 located at the outer side in the width direction of the tire is formed as shown in FIG. 1 to FIG. 3. With this arrangement, the deformation of the thin rib 5 due to a compression load at the contact with the ground is transferred evenly on the circumference; and thus local wear of the shoulder rib 2S is reduced.

In the pneumatic tire of the present invention, when the rib width of the thin rib 5 is constant in the circumferential direction of the tire, the deformation of the thin rib 5 due to a compression load at the contact with the ground is transferred evenly on the circumference thereof. Accordingly, local wear of the shoulder rib 2S is prevented effectively. Therefore, the ratio WO/W8 between a rib width WO of the thin rib 5 excluding the protruding portion 8 and a rib width W8 of the thin rib 5 including the protruding portion 8 is preferably arranged to be 0.8 to 1.2, more preferably 0.9 to 1.1.

Figure 4:
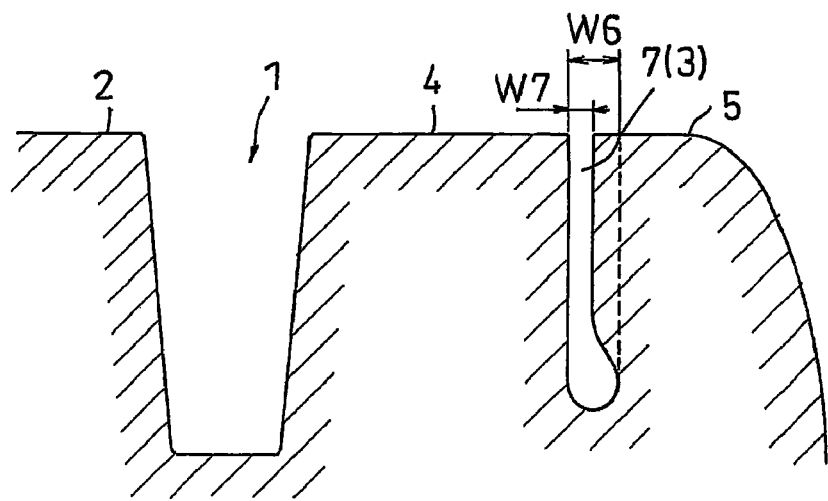
FIG. 4 is a cross sectional view in a direction of an arrow A-A of FIG. 2.
Figure 5:
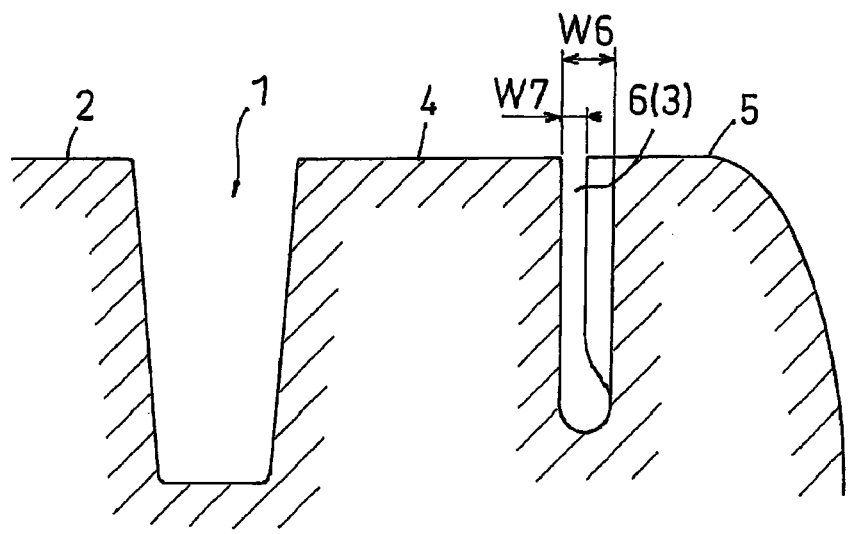
FIG. 5 is a cross sectional view in a direction of an arrow B-B of FIG. 2.

In the present embodiment, the groove width of the small-width portion 7 at the groove bottom is enlarged toward the thin rib 5 side, and the groove width of the thin groove 3 at the groove bottom is arranged to be constant in the circumferential direction of the tire as shown in FIG. 4 and FIG. 5. With this arrangement, not only in the large-width portion 6 but also in the small-width portion 7, a large curvature can be ensured at the groove bottom. Even when the thin rib 5 deforms largely, the stress is prevented from converging at the groove bottom; and thus the crack-proof performance at the groove bottom can be increased. Here, in the small-width portion 7, if the groove width at the groove bottom is expanded toward the main rib 4 side also, the rigidity of the main rib 4 is decreased. When the thin rib 5 receives a force from a road surface and is tilted onto the main rib 4, the main rib 4 deforms easily. Accordingly, the preventive effect against the irregular wear is decreased. Therefore, in the small-width portion 7, the groove width at the groove bottom is preferably expanded toward the thin rib 5 side only.

By arranging the ratio nL6/L to be 0.2 or more between the length L of the thin groove 3 in the circumferential direction of the tire and the total length nL6 of the large-width portion 6 in the circumferential direction of the tire (total lengths of L6 in the large-width portions 6 in the circumferential direction of the tire), the thick portion of the thin groove forming blade is ensured at a ratio of 0.2 or more. Accordingly, the durability of the thin groove forming blade can be ensured further satisfactorily.

By arranging the ratio nL7/L to be 0.3 to 0.4, more preferably 0.5 to 0.6 between the length L of the thin groove 3 in the circumferential direction of the tire and the total lengths nL7 of the small-width portion 7 in the circumferential direction of the tire (total length of L7 in the small-width portion 7 in the circumferential direction of the tire), the thin rib 5 comes into contact with the main rib 4 and is easily deformed onto the main rib 4 along therewith. Accordingly, the irregular wear of the shoulder rib 2S can be prevented effectively and the durability of the thin groove forming blade can be also satisfactorily ensured.

On the other hand, when the ratio nL6/L of the large-width portion 6 exceeds 0.8, the ratio nL7/L of the small-width portion 7 is reduced. As a result, it becomes harder for the thin rib 5 to come into contact with the main rib 4 and to be deformed therealong. Accordingly, the effect to prevent the irregular wears of the shoulder rib 2S tends to be reduced.

Further, the ratio L6/L7 is preferably arranged to be 0.25 to 1.5 between the length L6 of the large-width portion 6 in the circumferential direction of the tire and the length L7 of the small-width portion 7 in the circumferential direction of the tire. By arranging, continuously one after the other, the large-width portion 6 and the small-width portion 7, which are in the above-described relationship in length, a well-balanced relationship of the rigidity in the circumferential direction of the blade and the thin rib 5 is satisfactorily ensured.

EXAMPLES

Hereinafter, Examples demonstrating the constitution and effect of the present invention will be described. Evaluation items and measurement methods carried out on Examples and Comparative Examples are as described below.

(1) Irregular Wear-Proof Performance

Figure 6:
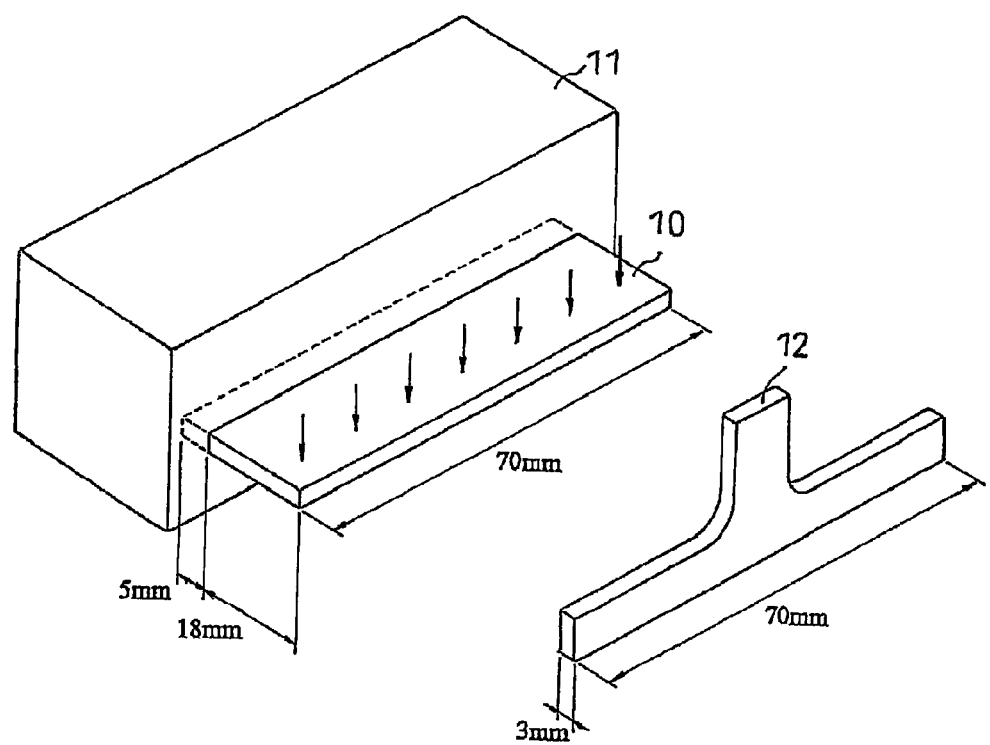
FIG. 6 is a figure showing an evaluation method for durability of a thin groove forming blade.

Test tires were mounted on the front wheel of a tractor head. Amount of irregular wear was measured and evaluation was made after running 150,000 miles (240,000 km) on a dry road surface under the following conditions: i.e., inner pressure: 760 kPa, load: 2800 kgf. The criteria were as described below.
A: No irregular wear was found
B: Slight irregular wear was found but replacement was not needed
C: Heavy irregular wear was found and replacement was needed (2) Groove-Bottom Crack-Proof Performance After completing the test (1), cracks at the groove bottom were visually checked for and an evaluation was made. The criteria were as described below.
A: No crack was found after running 150,000 miles
B: Allowable cracks were found after running 150,000 miles
C: Cracks were found after running 100,000 miles (3) Durability of Thin Groove Forming Blade Sample blades 10 were prepared by cutting off thin groove forming blades respectively in dimensions of 70 mm in length and 23 mm in height (in Example 1 and Comparative Example 1, a small-width portion was located at the center, and large-width portions were located at both ends). As shown in FIG. 6, the sample blade 10 was embedded by 5 mm in a base material 11 of AC7A (conforming to JIS H5202 (1999)). A convergence load was applied to the front end of the sample blade 10 in a direction indicated by arrowheads with using a pressurizing end 12 shown in FIG. 6, and 0.2% durability was measured. On the other hand, a standard sample was prepared by cutting off a thin groove forming blade, which was 2.0 mm in uniform thickness, 70 mm in length and 23 mm in height; with no deformation after having been used for vulcanization 10,000 times. The identical 0.2% durability was measured. The durability of the respective sample blades 10 was compared with the identical durability of the standard sample. The durability evaluation was made on the respective thin groove forming blades. The criteria were as described below. As the material for thin groove forming blades, in Example 1 and Comparative Examples 1 to 3, the identical material (conforming to SUS304-CSP (JIS G4313 (1976)) was used.
A: 120% or more durability of the standard sample
B: 70% or more and less than 120% durability of the standard sample
C: Less than 70% durability of the standard sample Example 1

A pneumatic tire (size: 295/75R22.5) shown in FIGS. 1 to 3 was prepared, in which depth of the thin groove 3 was 14.5 mm; groove width W6 of the large-width portion 6 was 3.0 mm; groove width W7 of the small-width portion 7 was 1.0 mm; length L6 of the large-width portion 6 in the circumferential direction of the tire was 20 mm; length L7 of the small-width portion 7 in the circumferential direction of the tire was 30 mm; the ratio nL6/L of the total length nL6 of the large-width portion 6 in the circumferential direction of the tire with respect to the length L of the thin groove 3 in the circumferential direction of the tire was 0.4; the ratio nL7/L of the total length nL7 of the small-width portion 7 in the circumferential direction of the tire with respect to the length L of the thin groove 3 in the circumferential direction of the tire was 0.6; rib width W8 of the thin rib 5 including the protruding portion 8 was 3.0 mm; and ratio WO/W8 of the rib widths WO of the thin rib 5 excluding the protruding portion 8 and W8 of the thin rib 5 was 0.98 to 1.01. The above described evaluations were carried out.

Comparative Example 1

A pneumatic tire, which has the same constitution as that of Example 1 except that the edge line 9 of the thin rib 5 at the outer side in the width direction of the tire was formed in a straight-line configuration, was prepared as Comparative Example 1. The above described evaluations were carried out.

Comparative Examples 2 and 3

Pneumatic tires were prepared as Comparative Examples 2 and 3, in which depth of the thin groove was 14.5 mm; groove width of the thin groove in the circumferential direction of the tire was constant (Comparative Example 2: 0.5 mm, Comparative Example 3: 3.0 mm), and the rib width of the thin rib was constant (Comparative Example 2: 3.0 mm, Comparative Example 3: 3.0 mm). The above evaluations were carried out. The results are shown in Table 1.

TABLE 1

|  | Comparative Example 1 | Comparative Example 2 | Comparative Example 3 | Example 1 |
|---|---|---|---|---|
| Irregular wear-proof performance | 100 | 130 | 80 | 120 |
| Groove-bottom crack-proof performance | 100 | 50 | 100 | 100 |
| Durability of thin groove forming blade | B | C | A | B |

The test result in Table 1 demonstrates the following facts. That is, Example 1 exhibits satisfactory characteristics in durability of the thin groove forming blade, groove bottom crack-proof performance of the pneumatic tire and also exhibits an excellent characteristic in irregular wear-proof performance. On the other hand, although Comparative Example 1 exhibits satisfactory characteristics in durability of the thin groove forming blade and groove bottom crack-proof performance of the pneumatic tire same as those in Example 1, the irregular wear-proof performance of the pneumatic tire of Comparative Example 1 was inferior to that of Example 1. Comparative Example 2 exhibits superiority in irregular wear-proof performance, but is inferior to Example 1 in groove bottom crack-proof performance and the durability of the thin groove forming blade. In Comparative Example 3, although the durability of the thin groove forming blade is excellent, the irregular wear-proof performance is inferior to that of Example 1.

What is claimed is:

1. A pneumatic tire comprising a shoulder rib segmented into a main rib located at the inner side thereof in a width direction of the tire and a thin rib located at the outer side thereof in the width direction of the tire by a thin groove extending along a circumferential direction of the tire, wherein
an inner wall of the thin groove located at the main rib side extends in a planar surface along the entire circumferential direction of the tire,
the thin groove includes a large-width portion having a relatively larger groove width and a small-width portion having a relatively smaller groove width continuously formed one after the other along the circumferential direction of the tire, and an inner wall of the large-width portion located at the thin rib side is disposed at a further outer side with respect to an inner wall of the small-width portion located at the thin rib side as viewed in the width direction of the tire,
a protruding portion protruding outwardly in the width direction of the tire from an edge line of the thin rib located at the outer side in the width direction of the tire is formed at a position where the large-width portion is disposed in the circumferential direction of the tire, wherein the rib width of the thin rib is substantially constant along the entire circumferential direction of the tire.

2. The pneumatic tire according to claim 1, wherein the small-width portion has a groove width at the groove bottom enlarged toward the thin rib side and a groove width of the thin groove at the groove bottom is constant in the circumferential direction of the tire.

3. The pneumatic tire according to claim 1, wherein the ratio of a total length of the large-width portion in the circumferential direction of the tire with respect to a total length of the thin groove in the circumferential direction of the tire is 0.2 or more.

* * * * *